May 18, 1948.  D. M. WARNER  2,441,608
AUTOGRAPHIC RECORDING TORQUE TESTING MACHINE
Filed March 11, 1944  4 Sheets-Sheet 1
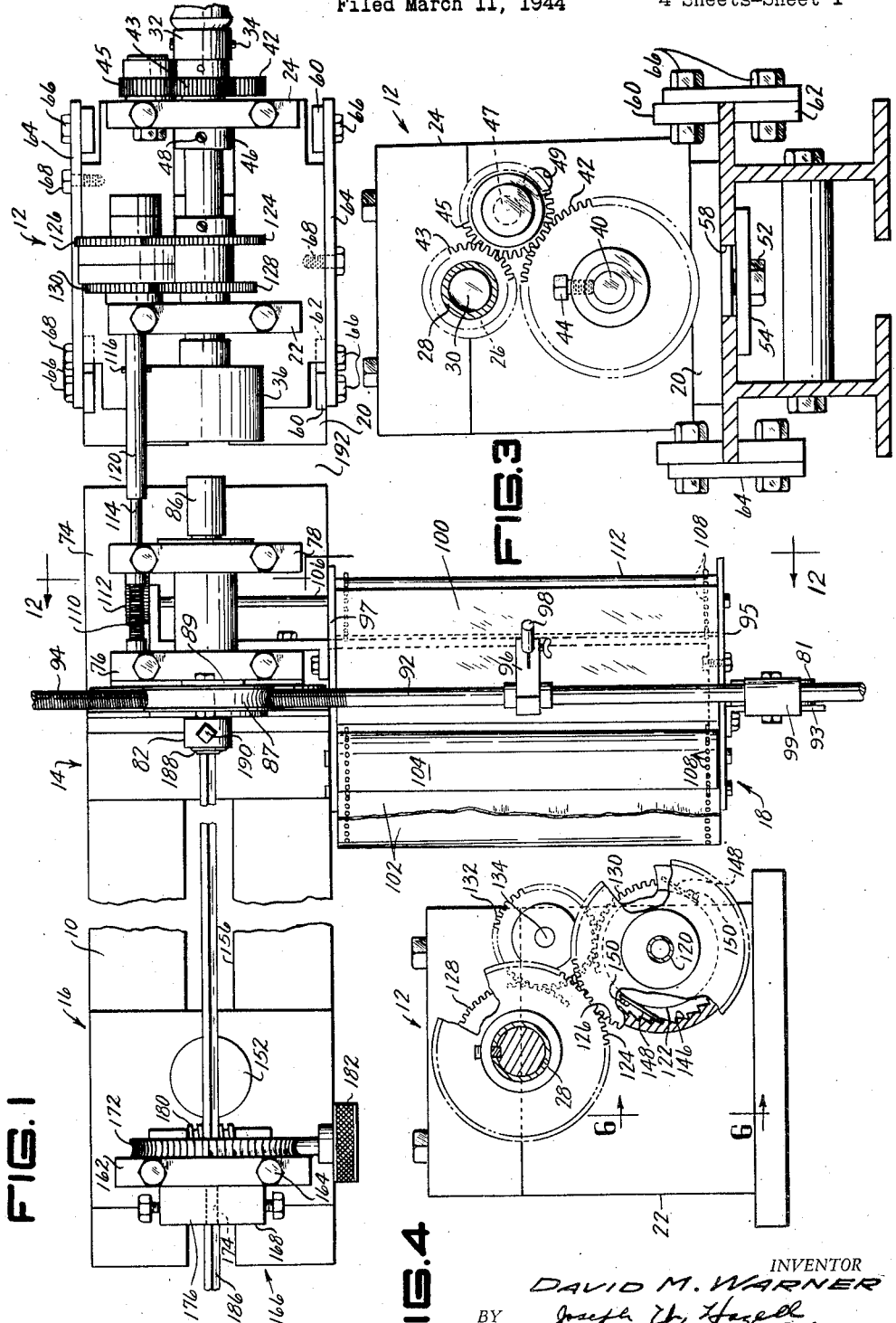

May 18, 1948. D. M. WARNER 2,441,608
AUTOGRAPHIC RECORDING TORQUE TESTING MACHINE
Filed March 11, 1944 4 Sheets-Sheet 2
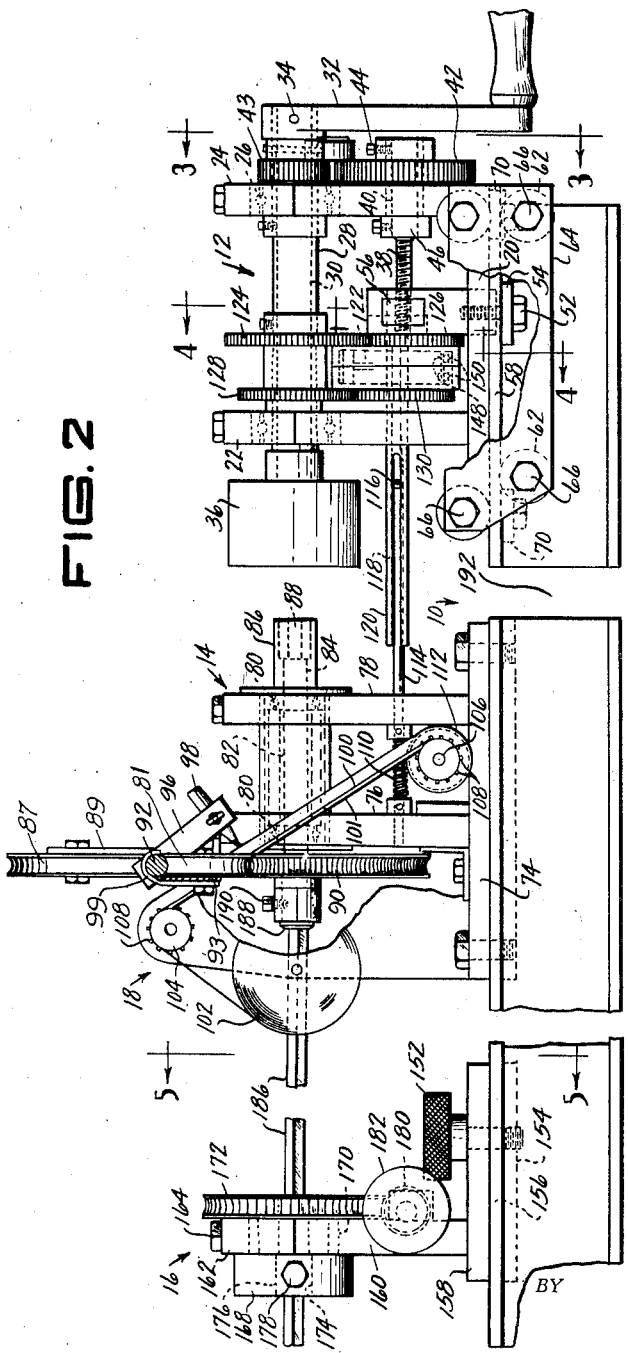
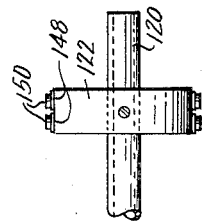
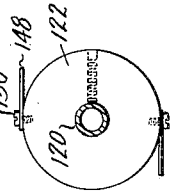
INVENTOR
DAVID M. WARNER
BY
ATTORNEYS May 18, 1948.   D. M. WARNER   2,441,608
AUTOGRAPHIC RECORDING TORQUE TESTING MACHINE
Filed March 11, 1944   4 Sheets-Sheet 3

INVENTOR
DAVID M. WARNER
BY
ATTORNEYS

May 18, 1948. D. M. WARNER 2,441,608
AUTOGRAPHIC RECORDING TORQUE TESTING MACHINE
Filed March 11, 1944 4 Sheets-Sheet 4
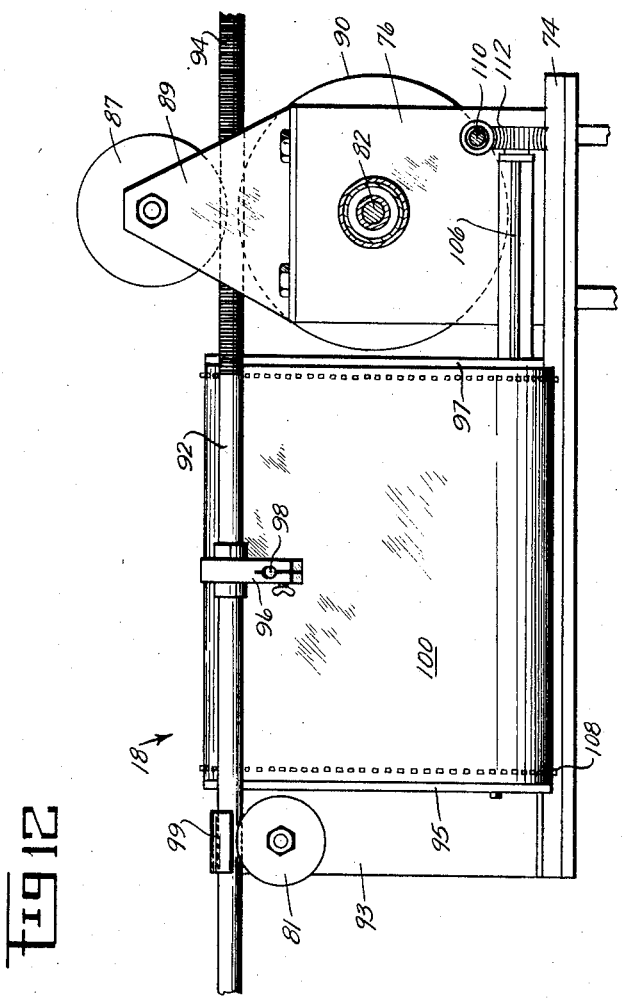
INVENTOR.
DAVID M. WARNER Patented May 18, 1948

2,441,608

UNITED STATES PATENT OFFICE 2,441,608

AUTOGRAPHIC RECORDING TORQUE TESTING MACHINE

David M. Warner, Dayton, Ohio; Garnett L. Warner executrix of said David M. Warner, deceased Application March 11, 1944, Serial No. 526,102

8 Claims. (Cl. 73—133)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to torque testing machines for the application to and measurement of twisting or rotational moment to materials, parts, or assemblies, and particularly to a machine for measuring the torque required to rotate one of two friction-coupled members with respect to the other.

In automotive land vehicles or aircraft construction a great many assemblies are held together by means of bolt and nut fastenings, and due to the vibration to which such assemblies are subjected, some sort of locking device, such as a lock washer, cotter-pin or lock nut must be provided to prevent the nut from loosening and coming off. Such a nut, containing a friction or locking device within itself, intended to oppose or prevent free rotation on the bolt, is called a self-locking nut.

A favored form of self-locking nut presently used in large volume is one which depends for its locking ability entirely on an incorporated feature or device which applies the necessary amount of braking friction to the bolt threads independent of any friction resulting from assembly load to develop the desired amount of torsional resistance to turning off the bolt. However, if the self-contained braking friction of these nuts is too great there is danger of damaging the threads or the bolt, and conversely, if the frictional resistance to turning is insufficient, the nut may loosen and come off, due to vibration.

Where this type fastening is employed, it is therefore highly essential that the tightness between bolt and nut be kept not only at a high value, but to a uniform standard, as between all bolts and nuts of a given size. It is therefore an object of this invention to provide a machine which may be set for a given sized bolt and nut, and which will thereafter measure and graphically record the torque taken to turn the threads of a series of bolts either into or out or those of the corresponding nuts and the degree of uniformity in the frictional resistance at the different parts of the same bolt or between different bolts of the same size.

Other objects will be recognized as the invention is further described and reference made to the drawing. The autographic recording torque testing machine, represented by the attached drawing is a machine especially adapted to the determination of the torque developed by self-locking nuts and the making of continuous complete graphic records of the torque developed throughout the duration of the test in both installation and removal operations through any number of cycles at room or at higher or lower temperatures.

It consists essentially of units as follows:

A. Driving unit to screw the bolt into and out of the nut, which may be called the torque applying unit.

B. Torque weighing unit to hold either the nut or bolt and to weigh the torque developed by the nut during the complete series of turning operations.

C. Autographic recording unit to make a complete graphic record of the torque developed by the nut throughout the test—this part of the apparatus may be called the torque recording unit; and D. Tail stock for anchoring the outer end of the torque resistance bar and adjustable to the required distance from the weighing unit, of which it is a part, this part being termed the torque resisting unit.

E. Base or supporting frame upon which the units of the torque testing machine are mounted for operation.

In the drawing,

Fig. 1 is a top plan view of the complete machine.

Fig. 2 is a front elevation.

Fig. 3 is a transverse section taken on the line 3—3 of Fig. 2, showing the lead screw operating gear train of the torque applying unit.

Fig. 4 is a transverse section taken on the line 4—4 of Fig. 2, showing the gear train and other feed mechanism for operating the torque recording unit.

Figs. 9 and 10 are front and end views, respectively, of the rotor shown in the assembly of Fig. 6.

Fig. 12 is a transverse section taken at 12—12 of Fig. 1 showing the indicator wheel and rod.

Figs. 3 to 10 are drawn to a larger scale than Figs. 1 and 2.

Like reference characters refer to like parts throughout the several views.

Figure 6:
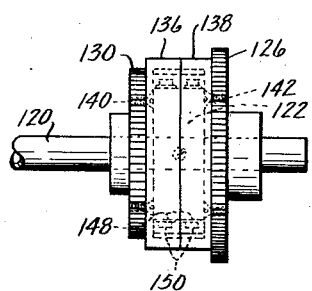
Fig. 6 shows an elevational view of a part of the feed mechanism shown in Fig. 4 and viewed from the line 6—6 of Fig. 4.
Figure 7:
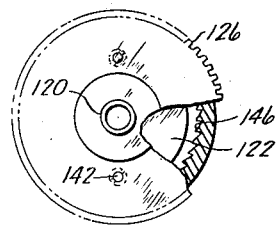
Fig. 7 is a right-hand end view of Fig. 6 with a portion broken away to show the interior construction.

Referring now to the drawing, a bed plate 10, which is somewhat in the form of a lathe bed, carries, at the right end, a traveling head 12; on the middle portion, a torque measuring head 14; and at the left end, a tail stock 16. A recording mechanism 18 is attached to the torque measuring head 14 and is operated therethrough. The several units 12 to 18, inclusive, each perform a separate function in the testing of the threads. The head 12 is arranged to hold the bolt and rotate it backward and forward and simultaneously move it axially back and forth at the rate which it would move if it were being screwed into and out of a stationary nut. The torque measuring head 14 has provision for holding the nut against the torque occasioned by driving the bolt into it and a yielding means for measuring the degree of torque thus required.

The recording mechanism 18 translates the torques required to turn the bolt into and out of the nut into transverse oscillations, and records them on a moving paper roll. Provision is made whereby the paper roll moves at the same rate and in the desired direction, whether the bolts are rotated one way to turn them into the nuts, or the other way to turn them out of the nuts. The tail stock 16 is provided for holding a torque rod, which holds the spindle of the torque measuring head 14 against rotation when the threads are being tested.

The traveling head 12 comprises a base 20 with two uprights 22 and 24, which support the bearings 26 for the hollow shaft 28. A solid spindle 30 is axially slidable in the hollow shaft 28, but is provided with spline means to prevent relative rotation between the shaft and spindle. By employing this construction, the spindle 30 may be pushed back into the hollow shaft 28 to facilitate entry or removal of the work to be tested. A crank 32 is attached to the hollow shaft 28 by a pin 34, whereby the shaft 28 may be rotated in either direction to turn the bolt threads into or out of the nut. The solid spindle 30 is enough shorter than the shaft 28 that the pin 34 clears the rear end of the solid spindle. A motor or other power means may, of course, be employed instead of the crank 32.

The forward end of the solid spindle 30 is provided with a chuck 36 for holding the heads of the bolts as they are driven into and out of the threads of the nuts.

In order to neutralize the end thrust which would be occasioned if the bolt entering the nut were required to pull the traveling head 12 after it, separate means is provided for moving the head 12 longitudinally of the bed at the exact rate required by the pitch of the threads being tested. This means consists of a feed screw 38, which has an integral journal portion 40 rotatably supported in the upright 24 and provided with a driving gear 42 held onto the journal portion 40 by a set screw 44. A collar 46 held on by set screw 48 prevents axial movement of the journal portion 40. The gear 42 is driven by a pinion 43 through an idler pinion 45 rotatable on the stud 47. Pinion 43 is fast on the hollow shaft 28. The pinions 43 and 45 have a like number of teeth, which is half the number of teeth on the gear 42, whereby the gear 42 is driven at half the speed of the shaft 28.

As a consequence, the feed screw 38 is provided with threads having double the pitch of the bolt being tested. For the larger sizes of bolts, however, the feed screw 38 may have threads of the same pitch as the bolt being tested, but in this case, a 1:1 ratio should exist between hollow shaft 28 and the feed screw 38. This ratio may be provided by removing the gear 42 and putting the pinion 45 in its place, then moving the idler stud 47 to the position 49 and placing the gear 42 on the idler stud. Thus, for the larger sizes of bolts which the machine has the capacity to test, the feed screw and the hollow shaft 28 will rotate at the same speed.

The torque measuring head 14, which occupies the middle portion of the bed plate 10 comprises a base 74 with two uprights 76 and 78 for carrying the bearings 80, upon which the torque measuring spindle 82 is rotatable. The front end of the spindle 82 is squared, as at 84. Socket 86 has one end fitted over the square part 84 and the other end 88 made to fit the nut, which is being tested. Obviously, sockets 86 may be made with openings 88 for various sized nuts, but all having the same opening 84 for fitting over the spindle.

Figure 8:
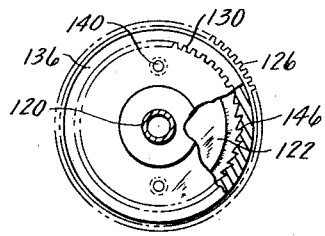
Fig. 8 is a left-hand end view of Fig. 6 with a portion broken away to show the interior construction.
Figure 5:
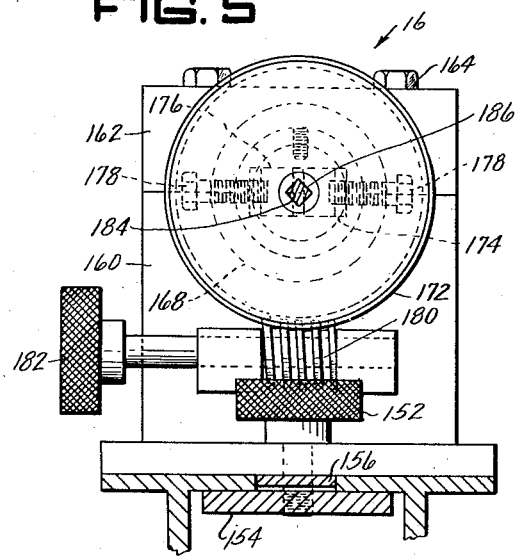
Fig. 5 is a transverse section taken on the line 5—5 of Fig. 2, showing the torque resisting unit looking toward the left.

Fast on the back end of the spindle 82 is an indicator wheel 90, the teeth of which are formed as in a worm wheel. A transverse rod 92 has a threaded portion 94, the pitch of these threads corresponding to the teeth of the gear 90 with which they are in mesh. The rod 92 and gear 90 do not, however, operate as a worm and worm wheel, but instead, operate more in the nature of a rack and gear movement, that is, when the torque, which is applied by the head 12 to the socket 86 turns the spindle 84, the rotation of the gear 90 will operate the rod 92 transversely of the machine. A grooved roller 87 carried upon a bracket 89 which extends upward from the upright 76 is positioned above the threaded portion 94 to just barely touch it, whereby the threaded end of the rod may not be inadvertently raised out of mesh with the indicator wheel. The outer end of the rod rests on top of another grooved roller 81 which is carried on a bracket 93 extending from the frame member 95. A hook member 99 is also carried on the bracket 93. Hook member 99 prevents the rod 92 being inadvertently raised out of engagement with the roller 81. The mid-portion of the rod 92 is provided with an arm 96 which carries a pencil 98, which is held by the weight of the arm on the paper 100, which is, in turn, supported by a platen 101 carried on the frame members 95 and 97. The paper is supplied from a roll 102, the paper passing over an idler roll 104 to a paper feeding roll 106. The idler roll 104 and the feeding roll 106 are driven by worm and wheel gearing 110—112. The worm 110 is carried on a shaft 114, which has a pin and slot connection 116—118 with the tubular shaft 120. The tubular shaft 120 is driven by a rotor 122 shown in detail in Figs. 8 and 9, and in the assembly, Fig. 6. The rotor 122 is driven by gearing from the hollow shaft 28, but inasmuch as the shaft 28 is rotated by the crank 32 alternately backward, then forward, means are provided for turning the rotor in the same direction, irrespective of which direction the shaft 28 rotates. This means comprises two gear trains connecting the shaft 28 and rotor 122, the one gear train, which consists of a gear 124 on the shaft 28, meshing directly into a gear 126, which is free on the tubular shaft 120, while the other gear train comprises a somewhat smaller gear 128, which is also fast on the hollow shaft 28, but which drives a gear 130 through an idler pinion 132. The idler gear rotates freely on the stud 134. The gear 130 is also free on the tubular shaft 120. By this arrangement, no matter which direction the shaft 28 is rotated, one or the other of the gears 126 and 130 will always be rotating forwardly.

This is due to the ratchet and pawl construction which immediately surrounds the rotor 122 and comprises drums 136 and 138, the first attached to the gear 130 by screws 140 and the second attached to the gear 126 by screws 142. The drums 136 and 138 both have internal ratchet teeth 146. The teeth in both drums are identical, both being so cut that the action of a pawl will move them forwardly. The pawls are carried on the rotor 122 and consist of pairs of flat springs 148 held to the rotor by screws 150, so that whichever of the two gears 126 or 130 happens to be rotating forwardly will drive the rotor 122 forwardly.

At the left end of the bed plate 10 the tail stock 16 is secured by the hand nut 152, the hand nut being adapted to draw up a clamping plate 154, which has a guide portion 156 slidable longitudinally in the slot in the middle of the bed plate 10, whereby the tail stock may be moved and reset in any desired position within its range. The tail stock consists of a base 158 with an upright 160, which has a cap 162 held on by screws 164. The upright 160 and cap 162 together provide rotative bearing for the special chuck 166. The chuck 166 consists of a body portion 168 brought to a smaller diameter at 170, where it has rotative bearing in the tail stock, a worm wheel 172 being permanently secured to the bearing portion 170 to rotate therewith. The body 168 of the chuck is provided with a rectangular opening 174, which holds a pair of jaws 176, which may be adjusted by the screws 178. The worm 180 meshes with the worm wheel 172, a hand nut 182 being provided for rotating the worm. The jaws 176 have suitable inner end formations at 184 to grip a square torque rod 186. The front end of the torque rod 186 has an enlarged shank 188, which is held in the end of the hollow spindle 82 by a set screw 190. The square portion of the torque rods 186 are made in different sizes for testing different sized threads. The shanks 188, however, are of the same size, so that the same socket in the end of the hollow shaft 82 will hold a series of rods of different sizes.

*Calibration.*—This machine must be calibrated to give a torque of known inch-pound values per inch of amplitude of graph. Otherwise it will not be possible to measure or evaluate the test torque results obtained.

This is accomplished most readily by means of lever and dead weight as follows: estimate the torque required for the test that is to be made; assemble the appropriate torque rod to give a graph of maximum permissible amplitude for that torque (greater amplitude is obtained either by lengthening the rod or by changing to a smaller rod); remove the nut wrench socket from the weighing shaft and fit a lever of convenient length, like a wrench, onto the end of the shaft; suspend a poise or the necessary known dead weight from the outer end of the lever at a measured distance in inches from the shaft center and at a point on the center line of lever to develop the desired torque in inch-pounds (lever in inches by weight in pounds); turn angular adjustment screw in tail stock until weight is lifted free and center line of lever is raised to level position; operate crank to travel paper forward sufficiently to mark starting line with pencil; without changing anything else, carefully remove the weight and then, by means of the lever, permit the weighing mechanism to rotate slowly to rest at zero torque; this will move the pencil laterally straight across the paper a distance proportionate to the inch-pounds of torque applied by weight and lever without regard to centerline of paper; again oscillate the crank to move the paper to mark the limit of amplitude produced by the known torque applied (lever in inches by weight in pounds); measure this width to the nearest hundredth of an inch (0.01″); divide the inch-pounds of torque by this amplitude in inches to get the calibration ratio or factor. (Not necessary to come out even, express in decimals); repeat the operation if not satisfactory the first time. When the amplitude of graph and the ratio obtained are satisfactory, adjust pencil to center line of paper by turning adjusting screw in tail stock and clamp firmly to prevent any play; the machine is now calibrated ready for use.

*Testing.*—When starting each test, write the number, size and thread data of the nut, together with the calibration ratio (inch-pounds per inch) on the paper to one side of the grap to avoid any possible mistake of uncertainty later when measuring the graph.

When the tests are finished, the test strip of graphs is laid out on a table where the graph for each nut is measured at all specified or desired points and the values tabulated. Such points usually include maximum and prevailing torques in first installation and both installation and removal prevailing torques in the final operation. The measurements are taken outward to either side from the center line in all cases and may be taken direct by steel scale or by means of dividers and scale. When all graphs have been measured and tabulated, a slide rule is set to the calibration ratio which is multiplied by the graph measurements to obtain inch-pounds of torque and tabulated in the next corresponding column for record.

Before starting the test, assemble the proper axial feed screw; then insert the bolt and screw nut on with fingers until self-locking device contacts the thread; slide bolt and nut assembly over to engage in wrench socket in weighing unit; start test by turning crank to screw bolt into nut to required number of turns (usually five or more); use practical speed to obtain steady results but not fast enough to heat too hot for the fingers to hold, or as may be specified; reverse and turn back the same number of turns as used in installation even if nut becomes loose before that number is reached; repeat until required number of assembly operations have been made.

The proper data will be recorded automatically near by each graph as described above. Care must be observed to avoid testing at a rate that will cause irregularities such as over-shooting beyond the true torque.

*Torque rods.*—High strength spring tempered torque rods with high elastic limit should be used in order to get the greatest amount of angular elasticity out of the rod without injury and thus enable the use of shorter lengths and smaller sizes.

For steels heat treated to a tensile strength of 150,000 pounds per square inch or above, it is safe to assume an elastic limit strength in torsion of ⅓ of the tensile strength. Therefore, for the rods heat treated to a tensile strength of 200,000 lbs./sq./in./, it should be safe to apply a torsional stress of approximately 66,000 lbs./sq./in./ without danger of causing permanent set. For rods of this quality, this value may be substituted for "S" in the formula, $S=TR/J$ for calculating the maximum allowable torque that may be applied to them.

For round rods, "$S=Tr/J$" becomes $$S=16T/\pi d^3\text{", or "}S=5.093\ T/d^3$$

Substituting the above value, $66,000=5.093T/d^3$, and $T=66,000d^3/5.093$, or $T=12.960d^3$, approx. For other values of S the torque T would be found in the same manner.

T=torque in inch-pounds.
S=torsional stress, pounds per sq. in.
r=radius of rod, ins.
d=diameter of rod, ins.
J=polar moment of inertia, $=Td^4/32$ for round rods.

The maximum allowable torque that may be applied to square, hexagon, or other shapes of rods may be calculated in the same manner by substituting the proper values for J.

The amplitude of graph produced by a given torque in a round rod may be determined by the formula, $m=32TLR/d^4G$, or $m=.00000278TLR/d^4$, wherein T and d=as above
L=length of rod, ins.
R=radius of indicator wheel (3 inc. in drawing)
G=modulus of elasticity in torsion, lbs./sq. in.,= 11,500,000 for steel
m=amplitude of graph, ins. (must be less than half of paper width).

The length of rod required to give a desired amplitude of graph may be calculated by substituting that value for m, the rod diameter for d, and the estimated torque for T in the above formula and then solving for L.

The amplitude of graph and the lengths of square rods or other shapes may be calculated in like manner by substituting the corresponding values. A square rod will take a little more torque and give a little less amplitude of graph than a round rod a diameter equal to the width of the square rod.

By having a series of several sizes of high strength torque rods, it will not be necessary to use very long rods. You must use rods big enough to take the torque load developed by the nut and you must produce enough amplitude to make a graph wide enough to obtain measurements of sufficient accuracy to be dependable.

Keep the rod sizes down to a minimum for a maximum amplitude for action and then add the necessary length to produce the desired amplitude. With high strength rods this will keep the machine as short as possible. An indicator wheel of larger diameter would give relatively greater amplitude of graph but would reduce sensitivity which would be very undesirable in the smaller nuts where small differences are important.

The ratio of paper travel to bolt turns may be changed by changing worm gear ratios to feed roller. A half inch of paper for five bolt turns has been found practical but more would give better definition. Longitudinal rulings on the paper are desirable but not essential. The perforated paper with constant center line is a great convenience because it stays adjusted to the same center.

As previously stated, it is not essential that the machine be calibrated each time to an even number of inch-pounds per inch because a fractional factor can be used just about as readily and it will save time when calibrating.

It would have been preferable to cause the drive shaft to feed in and out instead of moving the whole driving unit to and from the weighing unit to eliminate drag as the bolt was screwed in and out of the nut but no practical way was found to do it. Belts instead of gears have been used to drive the recorder, but they have not been satisfactory because of too much slippage. Also, it would probably have been better to have raised the axis of the machine higher above the bed to give more working clearance. For best results, a light machine is best for nuts up to perhaps a half inch and a heavier one should be provided for the larger nuts.

The operation of the device is as follows:

A nut, which is to be tested, is placed in the opening 88 of the socket 86, and the corresponding bolt is held by the head in the chuck 36. It must now be determined what degree of torque, preferably in foot-pounds, will be required to turn the bolt into the nut if the nut is sufficiently tight on the bolt. The hand wheel 182 on the upright 160 may now be turned so as to bring the arm 96, which holds the pencil 98 to a central position on the torque recorder. A suitable scale beam, preferably one of one-foot length, may now be attached to the spindle 82, preferably at the rear end thereof, in the neighborhood of the screw 190 and the predetermined weight necessary for turning the bolt thread into a nut of the proper tightness applied to the outer end of the scale beam. If this predetermined weight moves the pencil 98 laterally on the recorder a satisfactory distance, then it may be assumed that a torque rod of the proper tension has been selected. The weight and scale beam may now be removed.

With the hand crank 32, the bolt threads are now turned into those of the nut. The nut will, of course, resist being turned onto the bolt threads, and will therefore twist the spindle 82 and the gear 90 against the resistance of the torque rod 186. If the pencil 98 has moved as far laterally as it was previously moved by the scale beam and weight, the threads are of the proper tightness.

The hand crank 32 is now turned in the reverse direction so as to screw the bolt threads out of those of the nut, whereupon the twist on the torque rod 186 is opposite to that first recorded, and the pencil 98 will consequently move laterally but in the opposite direction, this process, that is, reversal in direction of the hand crank 32, may be repeated four or five times, each reversal being indicated by movement of the pencil away from its central position.

Figure 11:
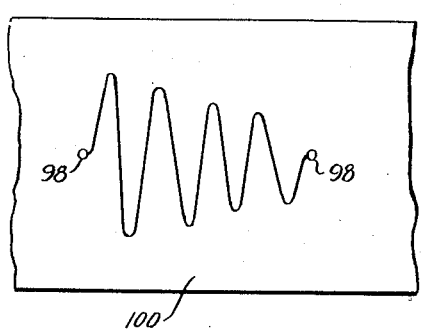
Fig. 11 is a graph made in conducting a test.

The paper 100, will, of course, during all of this procedure, be moving downward toward the feeding roll 106, whereby the oscillations of the pencil will produce a graph substantially as indicated in Fig. 11, each oscillation being somewhat shorter than the one previous because of a gradual slight loosening of the nut threads on the bolt threads as reverse rotations are repeated.

In the foregoing description of the operation of the device, it was assumed that the test was made at normal temperatures. At times, however, it becomes necessary to take these tests at sub- or super-normal temperatures. A gap 192 is provided in the bed plate 10, which, when desired, may be widened sufficiently to receive an electric furnace to apply a suitably predetermined degree of heat to the bolt and nut while the test is being made. For sub-normal temperatures, a refrigerating unit of the same size may be set at a desired temperature and similarly applied.

When testing at elevated temperature, special extension wrench sockets are provided to extend inside the furnace from the ends and hold the bolt and nut for testing. A thermocouple extends in through the socket from weighing end to contact the nut for indicating temperature. The temperature is then measured by means of a potentiometer at convenient location. The chuck does not extend into the furnace.

For testing at special temperatures it is necessary to provide extension sockets, or holders, in lieu of socket 86 and chuck 36 to hold the nut and threaded end of bolt midway in the furnace where the test is made as at normal temperature. In such case the extension socket for 36 should be tubular to carry a thermocouple in to contact the nut to indicate temperature during the test. The thermocouple leads out to a standard potentiometer by means of which the temperature is measured as in other tests.

Having described my invention, I claim:

1. In an apparatus for testing the tightness of externally threaded parts in internally threaded parts, the combination of a base; a torque applying unit on said base having means for holding one of said parts, and means for rotating said holding means in either direction; a torque weighing unit on said base having means for receiving the other of said parts, means for resiliently restraining said receiving means from rotating, and means for securing one end of said restraining means for unitary rotation with said receiving means; a torque resisting unit on said base having means for gripping the other end of said resilient restraining means, means for rotatably adjusting the said other end of the gripping means and means for longitudinally adjusting the said gripping means; a torque recording unit on said base having means for moving a graph paper with respect to said base, a pencil or the like adapted for contacting said paper, and a movable support for said pencil; means associated with said torque weighing unit and said torque recording unit operative upon rotative movement of the receiving means of said torque weighing unit in one or the other directions to cause movement of said pencil transverse to the movement of said paper in one or the other direction; means associated with said torque recording unit and said torque applying unit operative by rotation of said holding means of said torque applying unit in either direction to move said paper longitudinally in the same direction; and means associated with said torque applying unit and said torque weighing unit operative upon rotation of the holding means of said torque applying unit in one or the other direction to cause relative longitudinal movement between said torque applying unit and said torque weighing unit in one or the other direction in correspondence with the lead of the parts being tested.

2. The apparatus defined in claim 1 wherein the torque applying unit comprises a spindle head, a spindle rotatable in said head, a work holding means on one end of said spindle, a spindle rotating means on said spindle, a lead screw having rotative bearing in said head, a lead screw nut on said lead screw and fixed on said base, a gear train on said head connecting said spindle and said lead screw, a shaft for operating the recording unit, gearing connecting said spindle and said shaft and a double ratchet operative to rotate said shaft in the same direction upon rotation of said spindle in either direction.

3. The apparatus defined in claim 1 wherein the torque weighing unit comprises a spindle head, a spindle having rotative bearing in said head, a work holding means at one end of said spindle, and means at the other end for holding one end of said resilient restraining means.

4. The apparatus defined in claim 1 wherein the torque resisting unit comprises a spindle head, a spindle having rotative bearing in said head, means to selectively secure said spindle head in any desired position along said bed and means to rotatably adjust said spindle in said head.

5. The apparatus defined in claim 1 wherein the torque recording unit comprises a paper supply roll, an idler roll and a feed roll, a frame for rotatably supporting said rolls, a platen for supporting the paper, rotation transmitting means extending from said torque applying unit for rotating said feed roll to move said paper always in the same direction, and motion transmitting means extending from the torque weighing unit for moving said pencil crosswise of the movement of said paper.

6. In an apparatus for testing the tightness of externally threaded parts in internally threaded parts, the combination of a base; a torque applying unit on said base adapted for holding and rotating one of said parts; a torque weighing unit on said base adapted for receiving the other of said parts; means for resiliently restraining said receiving means from rotating; a torque recording unit associated with said torque weighing unit adapted for supporting and moving a graph paper in one direction only and with a pencil or the like adapted for contacting said paper and moving in one or the other direction crosswise of the movement of said paper by rotation of the receiving means of the torque weighing unit in one of the other direction; cooperating means between said torque applying unit and said torque recording unit adapted for moving said graph paper always in the same direction upon rotation of the holding means of the torque applying unit in either direction; and means adapted upon rotation of the holding means of the torque applying unit to cause relative longitudinal movement between said torque applying unit and said torque weighing unit corresponding to the lead of the threads on the parts being tested.

7. In an apparatus for weighing the torque required to rotate one of two friction coupled parts with respect to the other, the combination of a supporting frame; torque applying means on said frame for holding and rotating one of said parts, torque weighing means on said frame for receiving the other one of said parts and yieldingly restraining it from free rotation, a graph paper, a pencil, means operative by rotation of said torque applying means in either direction to move said graph paper in one direction only, and means operative by yielding rotation of said weighing means in either direction to draw said pencil over said graph paper in either direction crosswise of the direction of the movement of said paper.

8. Apparatus for continuously recording the torque required to cause a feeding movement in either direction between two interengaging threaded elements by relative rotation of the threaded elements, comprising means for restraining one of said threaded elements against rotation, means for applying torques to the other of said threaded elements first in one direction, then in the other to cause opposite relative rotations between said threaded elements, a torsion dynamometer associated with one of said elements for measuring the value of the applied torques, said torsion dynamometer including a dynamometer element movable from a neutral position in either direction in accordance with the direction and magnitude of the applied torques, a recording mechanism associated with said dynamometer element which comprises a graph strip and a writing point resting on said strip, means actuated by movement of said dynamometer element in one or the other direction to move said writing point in one or the other direction transversely of said strip, and means operative by movement of said torque applying means in either direction to move said strip lengthwise in the same direction.

DAVID M. WARNER.

REFERENCES CITED

The following references are of record in the file of this patent:

UNITED STATES PATENTS

| Number | Name | Date |
| --- | --- | --- |
| 908,128 | Petesch | Dec. 29, 1908 |
| 1,679,631 | Seagraves | Aug. 7, 1928 |
| 1,907,461 | Sunde | May 9, 1933 |
| 2,000,289 | Kramer | May 7, 1935 |
| 2,030,464 | Nilson | Feb. 11, 1936 |
| 2,190,967 | Zimmerman | Feb. 20, 1940 |
| 2,281,226 | Boles | Apr. 28, 1942 |
| 2,283,707 | Sturtevant | May 19, 1942 |
| 2,337,546 | Cox | Dec. 28, 1943 |